United States Patent
Thompson

[11] 3,760,297
[45] Sept. 18, 1973

[54] LASER TO OPTICAL FIBER COUPLING
[75] Inventor: George H. B. Thompson, Harlow, England
[73] Assignee: International Standard Electric Corporation, New York, N.Y.
[22] Filed: Jan. 20, 1972
[21] Appl. No.: 219,464

[52] U.S. Cl. .................................. 331/94.5, 350/96
[51] Int. Cl. ............................................. H01s 3/02
[58] Field of Search ................................. 331/94.5; 356/106 LR; 350/96

[56] References Cited
UNITED STATES PATENTS

| 3,222,615 | 12/1965 | Holly | 331/94.5 |
| 3,500,240 | 3/1970 | Kessler | 331/94.5 |
| 3,538,453 | 11/1970 | Miller | 331/94.5 |
| 2,314,096 | 3/1943 | Leverenz | 331/94.5 |
| 3,308,395 | 3/1967 | Sorokin | 331/94.5 |
| 3,408,131 | 10/1968 | Kapany | 331/94.5 |
| 3,340,108 | 9/1967 | Vickery | 331/94.5 |
| 3,248,671 | 4/1966 | Dill et al. | 331/94.5 |

Primary Examiner—William L. Sikes
Attorney—C. Cornell Remsen, Jr. et al.

[57] ABSTRACT

An optical fiber is coupled along an edge of a rectangular GaAs injection laser. A circulatory mode of light reflection is established between the four side walls of the laser at an angle of incidence which provides a narrow rectangular strip of light. The fiber is positioned transversely at one reflection point or corner of the light path. A narrow rectangular metal strip contact on one face of the laser confines current to the desired path. A reflective coating on an end of the fiber may provide a unidirectional optical source. Other variations include an optical amplifier for a light input source and an optical coupler from an input fiber to an output fiber.

15 Claims, 8 Drawing Figures

LASER TO OPTICAL FIBER COUPLING

BACKGROUND OF THE INVENTION

1. Field of the Invention

This invention relates to an optical coupling arrangement and more particularly to a method of achieving optical coupling between an optical fiber and a semiconductor laser.

Coupling arrangements constructed in accordance with the principles of this invention find application in fiber optic systems as optical sources, optical amplifiers, and as optical channel droppers.

2. Description of the Prior Art

The method of coupling may be contrasted with the conventional form of butt launching from the output face of a GaAs injection laser into the open end of an optical fiber waveguide comprising a core region surrounded by cladding. Butt launching requires close matching of the transverse spread of the laser mode and the optical fiber mode to be efficient. This is not achieved satisfactorily using current designs of laser. For instance, the most suitable stripe geometry double heterostructure laser fabricated according to established methods produces a filament of light about 0.5 $\mu$m x 10 $\mu$m in cross section, and typically less than 5 percent of this will couple to the cylindrical core of a fiber waveguide by direct end illumination. Quite considerable changes in design and construction are required to give appreciable improvement.

SUMMARY OF THE INVENTION

According to the present invention there is provided an optical coupling arrangement including a semiconductor laser adapted to lase in a circulatory mode ad having the side of an optical fiber attached to one side of the laser such that the fiber is optically coupled with said circulatory mode.

This invention discloses a radical change of launching method in which is launched by directional coupling into the sides of fibers. A laser arranged to operate in the totally internally reflected circulatory mode normally produces no output. However it is possible to couple energy into a suitable fiber if it is laid closely along one of the laser faces. The laser must be excited in a mode which produces a periodicity in optical disturbance along the face which matches the wavelength of the desired mode in the fiber. This can be achieved by causing the light energy to impinge on the output face at the correct angle. The correct angle is such that the light in the laser mode would be totally internally reflected at an interface between the laser and glass of the refractive index of the cladding of the fiber, but would emerge with a near grazing angle at an interface with glass of the refractive index of the core.

There follows a description of illustrative embodiments of the invention.

DESCRIPTION OF THE PREFERRED EMBODIMENT

Figure 1:
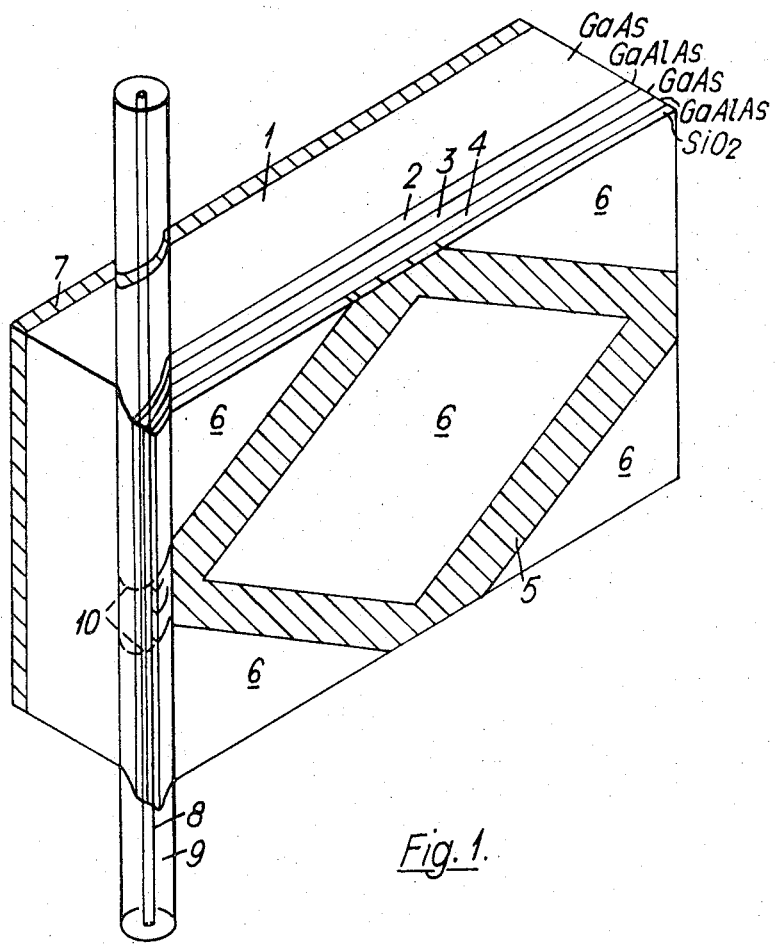
FIG. 1 depicts an optical coupling arrangement comprising an injection laser attached to one side of an optical fiber.

In FIG. 1 there is depicted a double heterostructure GaAs-GaAlAs injection laser chip comprising an n-type GaAs substrate 1, supporting an n-type GaAlAs layer 2, a GaAs layer 3 containing a $p$–$n$ junction, and a $p$-type GaAlAs layer 4. The side edges of the laser chip are made by cleaving so as to form reflecting walls extending in planes at right-angles to the plane of the layers and defining a rectangularly shaped $p$–$n$ junction. If the GaAs layer were uniformly excited it would be capable of sustaining a variety of circulatory modes the most simple one of which has the property that radiation propagating in this mode completes a closed path after making just one reflection at each of the four reflecting side walls. This mode can fill the whole optically excited region but if the width of the wavefront is restricted it will only occupy part of this region. The layer would also be capable of sustaining the normal Fabry-Perot type of modes.

The most simple circulatory mode is however preferentially excited by ensuring that the excitation of the GaAs layer is non-uniform and that in particular the excitation is confined to a narrow strip centered along the four sides of a parallelogram whose adjacent sides meet at the reflecting side walls and are equally inclined to the side walls in which they meet. The regions outside this zone of excitation are passive and optically absorbing, and so modes, such as the normal Fabry Perot modes, which are not entirely confined to the zone of excitation, are suppressed. The width of the wavefront of the excited mode is restricted to the width of the strips forming the excited zone. The selective excitation is achieved by current confinement using a metallic strip contact 5 of corresponding shape on the surface of the p-type GaAlAs layer 4. The remainder of the exposed surface of this layer 4 not covered by the metallic contact 5 is covered with a layer 6 of silica to provide electrical insulation so that this face of the laser chip can be bonded to a heat sink (not shown). The other electrical connection to the laser chip is by way of a metallic contact 7 of conventional form situated on the rear surface of the substrate 1. The side of an optical fiber, consisting of a fiber core 8 surrounded by cladding 9 of a lower refractive index than the cores, is attached to one side wall of the laser chip so that its core lies parallel and in registry with the GaAs layer 3.

In order to achieve optical coupling between the fiber and the laser it has already been stated that the periodicity of optical disturbance at the reflecting face of the laser adjacent the fiber must be matched with the guided wavelength of radiation of the same frequency propagating in the desired mode in the fiber. The periodicity of optical disturbance at the reflecting face of the laser is determined by the wavelength of the laser radiation in the laser and the angle of incidence with which this radiation strikes the reflecting surface. Considerations of simple trigonometry show that this angle of incidence is itself determined by the ratio of the length to the breadth of the GaAs layer 3, this ratio hereinafter being referred to as the aspect ratio of the laser.

The length of the coupling is defined by the portion of the reflecting side wall of the laser which is adjacent the fiber core and which lies within the boundaries of the region of the GaAs layer 3 to which current flow is confined. In FIG. 1 the coupling region is shown as lying between two limits indicated by dashed lines 10.

The actual degree of coupling achieved between the laser and the fiber will depend not only upon the coupling length but also upon the separation of the fiber core and the adjacent reflecting side wall of the laser.

Various considerations affect the choice of both these parameters. Thus, for instance, discrimination against the excitation of unwanted modes in the fiber should be considered. The transverse spread of the optical energy in the plane of the junction determines the width of the illumination of the output face of the laser and hence, with the optical fiber laid as shown across the face, the length of the coupling region. The length of the coupling region in turn determines the range of Fourier components in the periodicity of the surface optical distrubance and hence the resolution in the generation of wanted versus unwanted modes. A 10 $\mu$m wide lasing filiment (the minimum width that can conveniently be produced with a simple stripe contact without providing positive optical confinement in addition to current confinement) will, for instance, discriminate against modes in glass fiber separated in wavelength by 5 percent or more. The largest waveguide core diameter to give such a separation is 1.2 $\mu$m with a proportional refractive index difference ratio between core and cladding of 7 percent. To allow a ± 2.5 percent manufacturing tolerance on the required principal aspect ratio of the laser, these figures should be amended to a core diameter of 1 $\mu$m and a fractive index ratio of 10 percent. To attempt to launch into a single mode guide with a larger diameter, by increasing the transverse spread of the optical energy, would demand great accuracy in laser fabrication to satisfy the smaller tolerance range on the principal aspect ratio (proportional to (core diameter)$^{-2}$). To relax the tolerance, the spread of the optical energy might be reduced, but this would require a more positive guiding structure than the stripe contact. Alternatively, the fiber might be angled across the face, only coupling with a portion of the width of the filament, and at the same time making a small alteration to the phase matching. In both cases the core diameter of the fiber would have to be reduced in proportion to (coupling length)$^{one-half}$.

The spread of the optical energy in the direction normal to the junction has no effect on the mode discrimination and hence may be reduced by a suitable heterostructure to whatever extent is necessary for low threshold current.

Figure 2A:
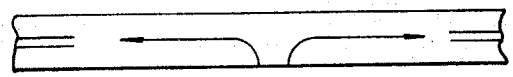
FIGS. 2a, 2b and 2c show diagrammatically how the arrangement of FIG. 1 may respectively be used as a bi-directional optical source, as a unidirectional optical source, and as an optical amplifier.
Figure 2A:
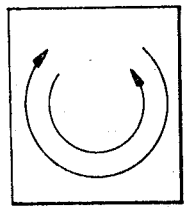
Figure 2B:
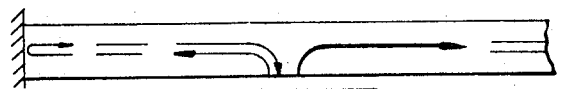
Figure 2B:
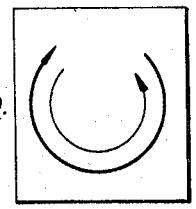

Optical energy is coupled equally out into both directions along the fiber from the two directions of circulation of light in the laser mode. Therefore the arrangement of FIG. 1 is suitable for direct application as a bi-directional optical source as illustrated in FIG. 2a. Alternately, energy can be fed into only one direction by terminating one end of the fiber with a reflective coating. Not only does the reflected energy return along the desired direction in the fiber but in the process it also couples into the laser mode of opposite circulation from which it was derived, synchronizes both modes and continues coherently with the output from the second mode. This form of unidirectional optical source is illustrated in FIG. 2b. Provided that there is no random internal coupling of the two modes, the phase of the reflection and the location of the reflecting termination is immaterial. An incidental advantage of this arrangement is that the main optical intensity in the cavity is in the form of the travelling wave content of the second mode. By eliminating optical nodes this tends to suppress higher order axial modes and therefore reduces the spectral width of the source.

It has been stated above that the degree of coupling depends on the separation of the fiber core from the surface of the laser, the remaining space being filled with material of the refractive index of the cladding. The coupling also depends somewhat on the spread of the laser filament in the direction normal to the junction. With a laser of low internal loss, whose threshold current $J_o$ with no external output is only a small proportion of the desired operating current $J$, the output coupling can be varied considerably without affecting the output greatly. For instance with $J/J_o = 5$ and with gain proportional to the cube of threshold current (typical of room temperature lasers) the output remains within 10 percent of its peak over a coupling range of 10 to 1. However at a given power level the number of axial modes will be increased as the coupling, and hence the threshold, is reduced. For this reason a spacing between the laser and the waveguide core of about 0.5–5 $\mu$m is preferred.

It is therefore necessary to cut away a considerable proportion of the cladding of a normal single mode fiber in the region where it contacts the output face of the laser.

The arrangement of FIG. 1 may be used as a laser amplifier. In this application it has advantages in two respects over the more conventional Fabry-Perot laser amplifier. Firstly both input and output are incorporated in a single fiber and secondly the device only amplifies in transmission and not in reflection.

Figure 2C:
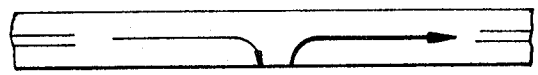
Figure 2C:
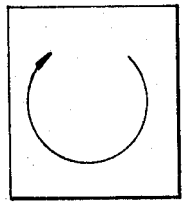

The action of the amplifier is illustrated in FIG. 2c. To provide gain the laser must be supplied with a current slightly less than the threshold for oscillation. Optical energy is then fed in from one end of the fiber and couples to one mode of circulation of the laser only. Amplification takes place in the resonator and the energy is coupled out into the fiber in its original direction. Energy propagating in the reverse direction in the fiber, is directionally amplified, of course, in a similar way, coupling in the process to the mode of reverse circulation.

Figure 2D:
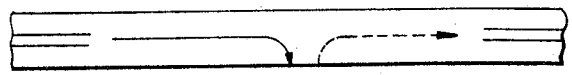
FIG. 2d shows diagammatically how by appropriately attaching a second optical fiber the arrangement of FIG. 1 may be adapted to provide an optical channel dropper.
Figure 2D:
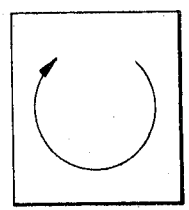
Figure 2D:
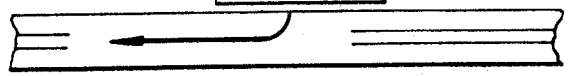

The arrangement of FIG. 1 may also be used for coupling energy over a narrow band of frequencies out of one fiber and feeding it, with amplification, into a second fiber. For this application also, the laser must be supplied with a current drive slightly less than the threshold for oscillation. This action as an optical channel dropper is illustrated in FIG. 2d. The second fiber is attached to the opposite face of the laser. By adjusting the coupling of the second output fiber to be sufficiently greater than the coupling of the input fiber it is possible to match the input. In this way all the power in the input over the appropriate narrow band of frequencies feeds into the laser, is amplified and couples to one direction only in the output fiber. Reverse waves in the input fiber would similarly couple, but to the opposite direction in the output fiber. In these conditions the laser will present negligible discontinuity to light of other frequencies propagating down the main fiber. This device can be adjusted to accept a much narrower band of frequencies than any conventional passive filter.

Reference has already been made to the fact that the tolerance requirements imposed upon the aspect ratio of the laser become increasingly stringent when coupling into fibers having larger core diameters. One way of achieving a relaxation in those tolerance requirements is to arrange for the circulatory mode of the laser to include passage through a portion of lower refractory index in which a reflection is made at near grazing incidence.

Figure 3:
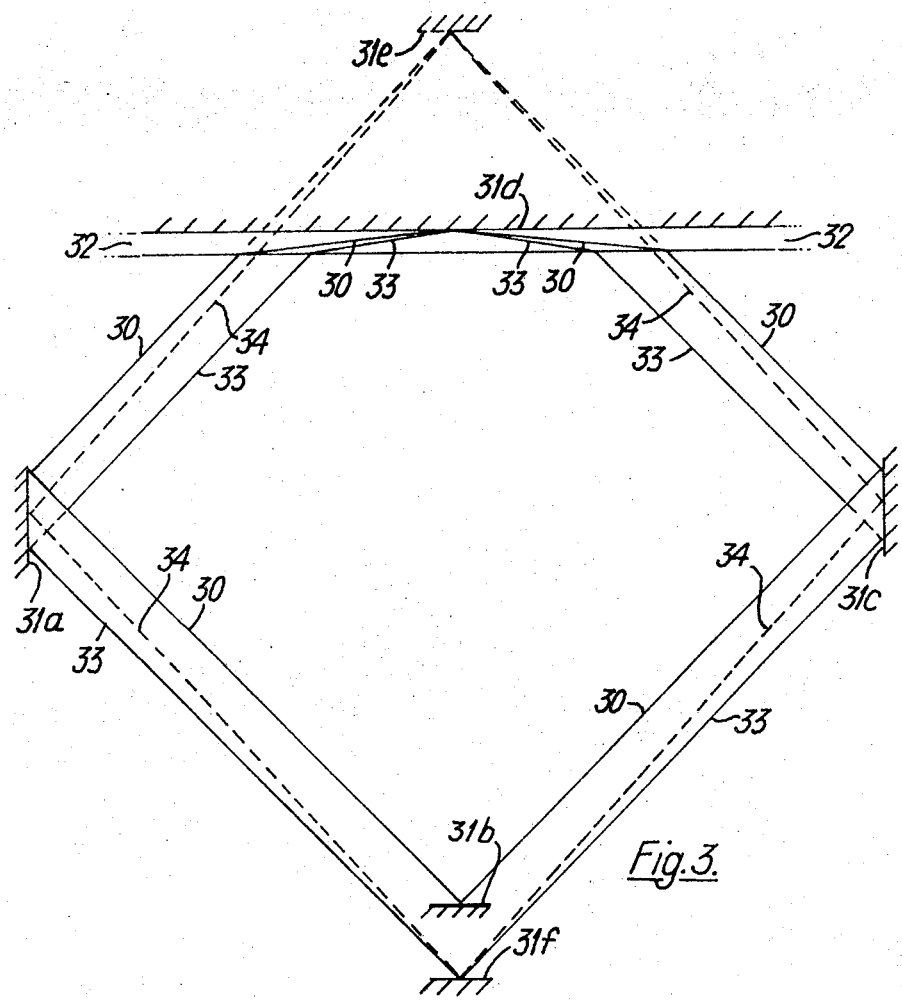
FIG. 3 is a diagram illustrating the effect of a region of lower refractive index upon the shape of a circulatory mode and its dependence upon the shape of the resonator.

This useful effect of such a portion of lower refractive index is now explained with reference to FIG. 3. In FIG. 3 a circulatory mode is shown by the ray path 30. This mode makes one reflection at each of four reflecting surfaces 31a 31b 31c and 31d. In front of reflecting surface 31d there is a region 32 of lower refractive index.

The equivalent structure constructed without the region of lower refractive index, which would provide a comparable mode in which the angles of incidence upon the three reflecting surfaces 31a 31b 31c are unchanged, requires the fourth reflecting surface to be located at the position 31e.

Now if the aspect ratio of the laser were altered by moving, say the reflecting surface 31b to 31f, the new mode that is set up in the structure having the region 32 of lower refractive index traces the ray path 33, whereas the new mode that would be set up in the equivalent structure not having the region 32 of lower refractive index would trace the ray path 34. In the region 32 of lower refractive index the ray path 33 is significantly inclined to the equivalent portions of the ray path 30, but it can be verified that outside this region 32 the angles of incidence are changed by a much smaller amount which is considerably smaller than the change between the ray path 30 and the ray path 34.

This FIG. 3 is therefore seen to illustrate the fact that the use of a region of lower refractive index makes the angles of incidence at reflection of the mode in the region of higher refractive index less criticaly dependent upon aspect ratio.

A convenient way of providing the lower refractive index region of the circulatory laser cavity is to use a short length of optical fiber guide sectioned along its axis through a diameter.

Figure 4:
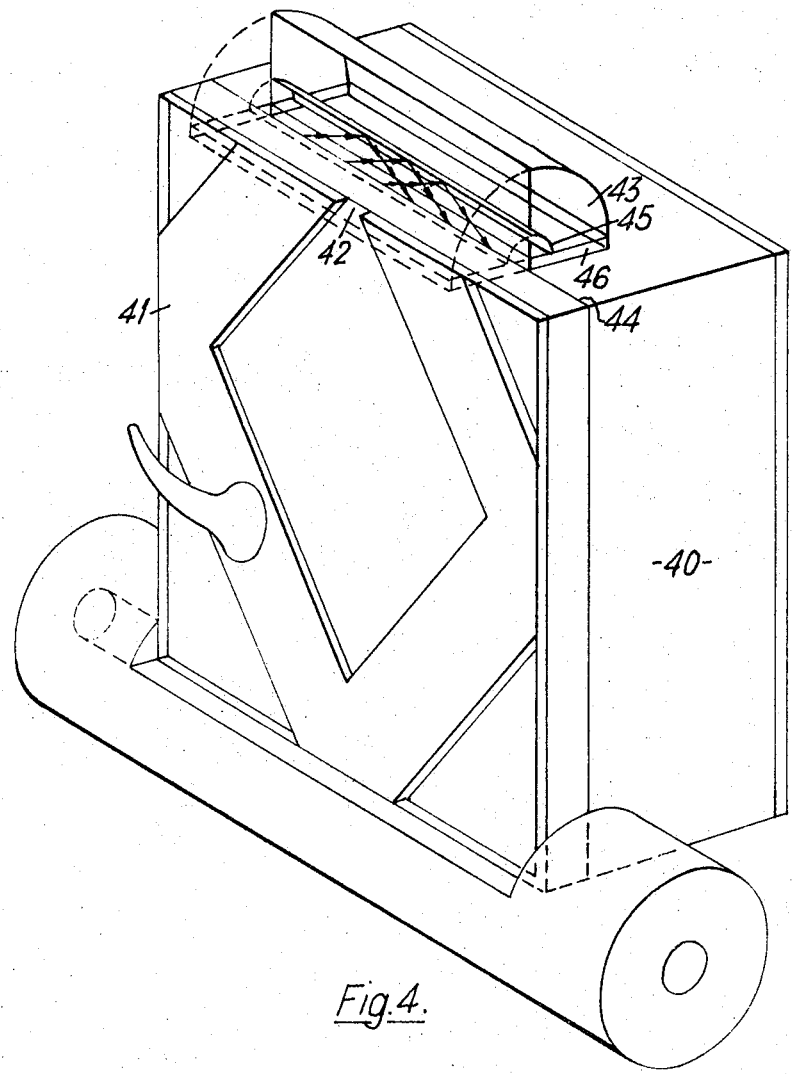
FIG. 4 depicts an optical coupling arrangement comprising an injection laser attached to one side of an optical fiber where the laser incorporates a short length of sectioned optical fiber.

An arrangement provided with such a piece of optical fiber is depicted in FIG. 4. In this figure there is depicted at 40 a double heterostructure GaAs-GaAlAs injection laser chip having substantially the same construction as that of the chip depicted in FIG. 1. Their aspect ratios are however different and a second difference is to be found in the shape of their current confining metallic contacts 5 and 41 respectively. The contact 41 is also in the form of a strip centered along the four sides of a parallelogram, but in this instance the parallelogram is truncated at one corner so that at one edge of the chip there is a gap 42 between two portions of the contact 41.

A short length of optical fiber guide, sectioned along its axis through a diameter so as to leave a half-cylindrical portion 43 is placed with its axis aligned and in registry with the laser's $p$–$n$ junction indicated at 44. In order to get efficient transfer of light from the laser chip into the core region 45 of the sectioned fiber 43, and from the core back into the laser chip again, an anti-reflection layer 46 is sandwiched between the two integers. For the specific purpose of illustrative clarity in depicting the launching of the laser light into the sectioned fiber and out of it again, only half of sectioned fiber 43 and its underlying anti-reflection layer 46 have been shown in full detail.

In the regions of the $p$–$n$ junction which underlie the shaped contact 41, the current flow across the junction will give rise to stimulated emission of light, but the presence of the gap 42 prohibits the formation of any laser mode confined exclusively to the semiconductive material of the chip. If the antireflection layer 46 is good enough, the reflection at that interface will be so small that no such mode could be supported, in which case the gap becomes unnecessary. The dimensions of the chip and the configuration of the contact 41 are however chosen in relation to the dimensions and optical properties of the sectioned fiber so that a mode is set up which is mainly confined to the semiconductive material, but which is completed by the light making a short excursion into the sectioned fiber. Light circulating clockwise under the contact 41 emerges from the edge of the laser chip on the lefthand side of the gap 42 at the appropriate angle to be launched into the sectioned fiber 43. It makes one reflection at the curved interface between core and cladding which redirects the light back into the chip at the appropriate position under the part of the contact on the right-hand side of the gap 42. The anti-reflection layer 46 merely serves to reduce to a minimum the losses at the interface between core and chip at the two places at which the light has to cross through it. A second mode will also be set up, in which the light traces the same path, but circulates in the opposite direction to that shown (clockwise), namely counter clockwise.

One of the advantages of using the core of a sectioned optical fiber, instead of a plane parallel layer for the region of lower refractive index, is that it tends to compensate the diffraction effects at the slit where the light emerges from the semi-conductor chip. These diffraction effects tend to make the emerging beam fan out sideways. The cylidrically curved surface of the fiber core tends to refocus the reflected light back to a narrow line on the exposed surface of the $p$–$n$ junction.

A modification to the above described optical coupling arrangements involves the interface between the semiconductor material and the output optical fiber guide. The core of this fiber guide must be placed so that the appropriate coupling coefficient is provided for the efficient coupling of energy out of the circulatory mode into fiber. An ancillary effect of this coupling is that although, within the stimulated emission region where there is current flow, the net transfer of energy is in the right direction, namely from the laser into the guide, in the passive regions beyond this excited region the transfer is in the wrong direction, namely from the guide into optically absorbing passive regions of the p–n junction.

Figure 5:
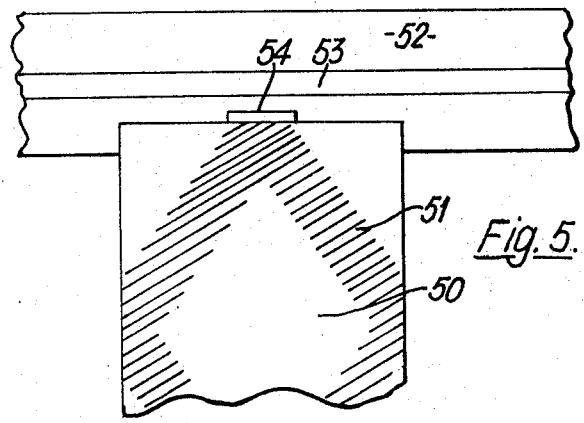
FIG. 5 depicts a cross sectional view in the plane of the $p$–$n$ junction of a modification to the arrangements of FIGS. 1 and 3.

In order to reduce the amount of this loss, the optical coupling should be made tighter in the region of the stimulated emission than in the passive regions beyond it. This is achieved by means of a refractive index matching interference layer placed between the core of the fiber guide and the stimulated emission region of the edge of the p–n junction. The location of this matching layer is depicted in FIG. 5 which is a cross-sectional view of the coupling sectioned in the plane of the p–n junction. In this figure the semiconductor material is indicated generally at 50, while the region of stimulated emission obtained by the current confining action of the shape of the overlying contact (not shown) is indicated by the shading 51. The output optical fiber guide is indicated generally at 52, and its core at 53. The refractive index matching interference layer is depicted at 54. In the direction transverse to the p–n junction it extends across the thickness of the semiconductor material, but in the axial direction of the fiber it extends only between the two limiting boundaries of the active stimulated region. This use of a matching layer is most beneficial in configurations requiring a relatively high degree of optical coupling between laser and fiber.

The layer 54 may be a quarter wavelength layer, but it is more effective if made thicker, say a three-quarter wavelength layer. The separation between core and p–n junction is then greater, for a given degree of optical coupling in the active region, and hence the optical coupling in the passive region is correspondingly reduced. In describing the thickness of such a layer in terms of wavelength fraction it must be noted that this has to be computed for the oblique angle of incidence at which the light of laser mode strikes the interface.

In some applications the dimensions are such that the use of this anti-reflection layer becomes virtually essential because the coupling length is so short that adequate coupling can not be achieved without it.

It is to be understood that the foregoing description of specific examples of this invention is made by way of example only and is not to be considered as a limitation on its scope.

What is claimed is:

1. An optical coupling arrangement comprising a semiconductor laser having two opposite rectangular faces and four adjoining reflecting side walls, a P-N junction region extending parallel to said faces and having edges along said side walls, said laser being adapted to lase within said junction in a circulatory mode between said side walls, light reflection within said junction being at an angle of incidence with each wall to provide a narrow strip of light having a corner reflection point on each side wall, and an elongated optical fiber having a side attached along one side wall of the laser junction region such that a portion of the length of the fiber is optically coupled with one reflection point of said circulatory mode.

2. An arrangement as claimed in claim 1 wherein said optical fiber includes an outer tubular cladding about an inner cylindrical core, a length of said core being in line and optically coupled with the p-n junction of the laser.

3. An arrangement as claimed in claim 2 including means for confining current across said p-n junction to within an area corresponding to said narrow strip of light to enable said circulatory mode to be preferentially excited.

4. An arrangement as claimed in claim 3 wherein said means comprises a narrow metallic contact strip on one face having a shape conforming to said narrow strip of light within said p-n junction.

5. An arrangement as claimed in claim 4 wherein the p–n junction of the laser lies in a layer of gallium arsenide.

6. An arrangement as claimed in claim 5 wherein the laser includes an inner junction layer of GaAs and respective layers of GaAlAs on opposite sides of said inner layer.

7. An arrangement as claimed in claim 4 wherein a refractive index matching interference layer is interposed between the core and the adjacent edge of the laser, said layer extending along only that portion of the edge at which the laser radiation is incident.

8. An arrangement as claimed in claim 7 wherein said interference layer is a three-quarter wavelength layer.

9. An arrangement as claimed in claim 4 wherein said metallic strip is in the shape of a parallelogram having four corners centered along respective side walls at said junction, the remainder of said face having a cover layer of silica.

10. An arrangement as claimed in claim 9 wherein the circulatory mode is such that the radiation propagating in the laser in said mode completes a closed path after making exactly one reflection in each of the four side walls.

11. An arrangement as claimed in claim 9 wherein said laser side wall is coupled to a portion of said cladding of lower refractive index than the core and the circulatory mode makes an excursion into said portion being reflected therein at near grazing incidence.

12. An arrangement as claimed in claim 11 wherein said lower refractive index portion is a length of optical fiber sectioned along it axis through a diameter and the reflection therein is at the curved interface between the inner core and outer cladding.

13. An arrangement as claimed in claim 12 wherein an anti-reflection interference layer is interposed between said portion of lower refractive index and the remainder of the laser.

14. An arrangement as claimed in claim 9 wherein said optical fiber includes a reflective coating at one end.

15. An arrangement as claimed in claim 9 including a second optical fiber coupled to said laser along an opposite side wall.

* * * * *

UNITED STATES PATENT OFFICE
CERTIFICATE OF CORRECTION

Patent No. 3,760,297   Dated September 18, 1973

Inventor(s) George H. B. Thompson

It is certified that error appears in the above-identified patent and that said Letters Patent are hereby corrected as shown below:

On the Title page, insert --

[32]  Priority February 5, 1971

[33]  Great Britain

[31]  4026/71

Signed and sealed this 25th day of December 1973.

(SEAL)
Attest:

EDWARD M. FLETCHER, JR.  RENE D. TEGTMEYER
Attesting Officer  Acting Commissioner of Patents